(12) United States Patent
Sugimoto (10) Patent No.: US 10,576,913 B2
(45) Date of Patent: Mar. 3, 2020

(54) VEHICLE WIRE HARNESS

(71) Applicant: YAZAKI CORPORATION, Tokyo (JP)

(72) Inventor: Terumitsu Sugimoto, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 20 days.

(21) Appl. No.: 15/938,554

(22) Filed: Mar. 28, 2018

(65) Prior Publication Data

US 2018/0215306 A1 Aug. 2, 2018

Related U.S. Application Data

(63) Continuation of application No. PCT/JP2016/078877, filed on Sep. 29, 2016.

(30) Foreign Application Priority Data

Sep. 29, 2015 (JP) ................. 2015-191705

(51) Int. Cl.
  *B60R 16/02* (2006.01)
  *B60Q 1/00* (2006.01)
  *B60R 16/023* (2006.01)
  *H05B 33/08* (2006.01)
  *H05B 37/02* (2006.01)

(52) U.S. Cl.
  CPC ........... *B60R 16/0207* (2013.01); *B60Q 1/00* (2013.01); *B60Q 1/0088* (2013.01); *B60R 16/02* (2013.01); *B60R 16/023* (2013.01); *H05B 33/0842* (2013.01); *H05B 37/0254* (2013.01)

(58) Field of Classification Search
  CPC .. B60Q 1/0088; B60R 16/0207; B60R 16/023
  See application file for complete search history.

(56) References Cited

U.S. PATENT DOCUMENTS

| 5,837,994 | A  | 11/1998 | Stam et al. |
| 6,255,639 | B1 | 7/2001  | Stam et al. |
| 6,587,573 | B1 | 7/2003  | Stam et al. |
| 6,611,610 | B1 | 8/2003  | Stam et al. |

(Continued)

FOREIGN PATENT DOCUMENTS

| DE | 102006010640 A1 * | 9/2007 | ......... B60R 16/0315 |
| DE | 102010030520 A1 | 12/2011 | |

(Continued)

OTHER PUBLICATIONS

Machine Translation of JP2006062594A.*

(Continued)

*Primary Examiner* — Raymond R Chai
(74) *Attorney, Agent, or Firm* — Sughrue Mion, PLLC (57) ABSTRACT

According to embodiments, a vehicle wire harness includes one end to be electrically connected to a control unit mounted on a vehicle and the other end to be electrically connected to one or more light sources. The vehicle wire harness further includes a driver operation portion configured to receive a control signal designating a lighting form for the one or more light sources from the control unit and to output a drive pattern for driving the one or more light sources. The driver operation portion is subordinate to the control unit.

8 Claims, 5 Drawing Sheets

(CONT.)

(56) References Cited

U.S. PATENT DOCUMENTS

| | | | | |
|---|---|---|---|---|
| 2004/0225811 | A1* | 11/2004 | Fosler | H05B 37/0254 710/305 |
| 2007/0291488 | A1* | 12/2007 | Heathcock | H05B 37/0272 362/276 |
| 2009/0002135 | A1* | 1/2009 | Dold | G05B 19/0423 340/10.51 |
| 2010/0088004 | A1 | 4/2010 | Maki | |
| 2010/0164409 | A1* | 7/2010 | Lo | H05B 33/0803 315/312 |
| 2010/0195820 | A1* | 8/2010 | Frank | H04L 9/0631 380/28 |
| 2013/0249417 | A1* | 9/2013 | Verlinden | H05B 33/0806 315/185 R |
| 2013/0285549 | A1* | 10/2013 | Aoki | B60R 16/0207 315/79 |
| 2015/0106540 | A1* | 4/2015 | Hoffmann | H04L 12/40039 710/107 |
| 2017/0015236 | A1 | 1/2017 | Masuda | |

FOREIGN PATENT DOCUMENTS

| | | | | |
|---|---|---|---|---|
| JP | 2006-62594 | A | | 3/2006 |
| JP | 2006062594 | A | * | 3/2006 |
| JP | 2006062594 | A | * | 3/2006 |
| JP | 2007-45407 | A | | 2/2007 |
| JP | 2007-276671 | A | | 10/2007 |
| JP | 2012-133985 | A | | 7/2012 |
| JP | 2015-71386 | A | | 4/2015 |
| WO | 2015/119046 | A1 | | 8/2015 |
| WO | WO-2015163312 | A1 | * | 10/2015 ............. B60R 16/02 |

OTHER PUBLICATIONS

Machine Translation of JP-2006062594-A (Year: 2006).*
Machine Translation of DE-102006010640-A1 (Year: 2007).*
International Preliminary Report on Patentability dated Apr. 3, 2018 by the International Searching Authority in counterpart International Patent Application No. PCT/JP2016/078877. (PCT/IB/337 and PCT/ISA/237).
Search Report dated Nov. 29, 2016 by the International Searching Authority in International Patent Application No. PCT/JP2016/078877. (PCT/ISA/210).
Written Opinion dated Nov. 29, 2016 by the International Searching Authority in International Patent Application No. PCT/JP2016/078877. (PCT/ISA/237).
Office Action dated Jan. 9, 2018 by the Japanese Patent Office in counterpart Japanese Patent Application No. 2015-191705.
Communication dated Mar. 7, 2019, issued by the European Patent Office in counterpart European Patent Application No. 16851776.1.

* cited by examiner

VEHICLE WIRE HARNESS

CROSS-REFERENCES TO RELATED APPLICATIONS

This application is a continuation of PCT application No. PCT/JP2016/078877, which was filed on Sep. 29, 2016 based on Japanese Patent Application (No. 2015-191705) filed on Sep. 29, 2015, the contents of which are incorporated herein by reference.

BACKGROUND

1. Field of the Invention

The present invention relates to a vehicle wire harness to be electrically connected to a control unit mounded on a vehicle at one end and to be electrically connected to one or more light sources at the other end thereof.

2. Description of Related Art

Conventionally, various pieces of electrical equipment for lighting are mounted on a vehicle such as a motor vehicle. For example, lamps such as a headlamp, a position lamp, a stop lamp, a tail lamp, a turn signal lamp and the like are mounted on the vehicle as electrical equipment for illuminating the outside of the vehicle when the vehicle travels. In addition, various lamps such as a room lamp, an illumination lamp for illuminating various pieces of onboard equipment such as an instrument panel or the like, a decorative illumination lamp, an indicating illumination lamp and the like are also installed in a passenger compartment of the vehicle.

In general, various pieces of electrical equipment like those described above are individually connected to a predetermined electronic control unit (ECU) by way of wire harnesses that are disposed so as to pass through relevant portions on a vehicle. Then, when the electronic control unit detects an operation of a predetermined switch by the driver or when a predetermined sensor detects a specific situation, the relevant electric equipment for lighting is switched on or off.

For example, a system for controlling headlamps of a vehicle is disclosed in Patent Document 1. In the system disclosed in Patent Document 1, a control unit that incorporates therein a microcontroller is described as switching on or off external lamps or generating various beam patterns by controlling luminance brightness, aiming, focus and the like of the external lamps based on various pieces of information acquired from various types of sensors.

In an onboard LED lighting system disclosed in Patent Document 2, a plurality of LED lamps that are disposed at various locations within a passenger compartment are connected individually to a plurality of slave electronic control units, and the plurality of slave control units are connected to a common master electronic control unit by way of corresponding wire harnesses. In addition, a jumper switch is provided in connectors of the wire harnesses.

In a vehicle lighting system disclosed in Patent Document 3, a control device (a microcomputer) and an emission light color control device are provided to control light sources (R, G and B LEDs) that are incorporated in a side rearview mirror. An illuminance sensor is connected to the control device, and a hazard switch and a turn signal switch are connected to the emission light color control device.

Patent Document 1: JP-A-2007-45407
Patent Document 2: JP-A-2007-276671
Patent Document 3: JP-A-2015-71386

Incidentally, in recent years, electrical equipment for lighting mounted on a vehicle is diversified widely. In addition to the type of such electrical lighting equipment itself, the form of lighting control also tends to be modified variously to match, for example, model types or grades of vehicles.

Specific examples of lighting controls will be described below.

(1) In the case of a vehicle of an entry grade, in many cases, lighting is switched on or off through a simple switching operation.

(2) In the case of a vehicle of a middle grade, a control pattern is often adopted in which light sources are sequentially switched on or off, starting with one in a central position.

(3) In the case of a vehicle of a high grade, for example, as in Patent Document 3, in many cases, exclusive electronic control units (ECUs) are connected individually to corresponding pieces of electrical equipment, so that specific lighting controls are performed individually on the pieces of electrical equipment.

However, the simple control described under (1) above cannot produce lighting of a high grade. In addition, when the control described under (2) above is attempted to be executed using a system adopting a standard communication line such as a controller area network (CAN), since the number of channels in a data communication is limited, even in the case where electrical equipment includes a number of light sources, the light sources cannot be controlled independently by making use of many channels. When the system described under (3) above is adopted, since exclusive electronic control units (ECUs) have to be developed for vehicles or pieces of electrical equipment, it is not possible to suppress an increase in development cost or parts cost.

In particular, in recent years, as disclosed in Patent Document 2 and Patent Document 3, in many cases, light emitting diodes (LEDs) are adopted as light sources for various types of lighting. Further, there is a tendency in which the number of LED elements that make up one piece of electrical equipment (a lamp) changes or increases greatly as the grade of a vehicle gets higher. In addition, in the case of electrical equipment that adopts a bi-color or tri-color LED device, the color of light emitted from the LED device needs to be controlled as required. Thus, in relation to an electronic control unit (ECU) for use in controlling electrical lighting equipment like this electrical equipment described above, the configuration of an output circuit (a driver) needs to be optimized or exclusive software needs to developed in accordance with a type of electrical equipment that makes up a light source. Further, the electrical equipment needs to be controlled so as to produce a feeling of high grade or obtain illumination light of high quality by making full use of the characteristics of the electrical equipment.

SUMMARY

One or more embodiments relate to a vehicle wire harness that is useful in making operations of a control unit common for various types of pieces of electrical equipment in configuring an onboard system for controlling a piece of electrical equipment including a light source.

According to embodiments, a vehicle wire harness includes one end to be electrically connected to a control unit mounted on a vehicle and the other end to be electrically connected to one or more light sources. The vehicle wire harness further includes a driver operation portion configured to receive a control signal designating a lighting form for the one or more light sources from the control unit and to output a drive pattern for driving the one or more light sources. The driver operation portion is subordinate to the control unit.

Other aspects and advantages of the invention will be apparent from the following description and the appended claims.

DETAILED DESCRIPTION

Specific exemplary embodiments will be described below by reference to the drawings.

First Exemplary Embodiment

Figure 1:
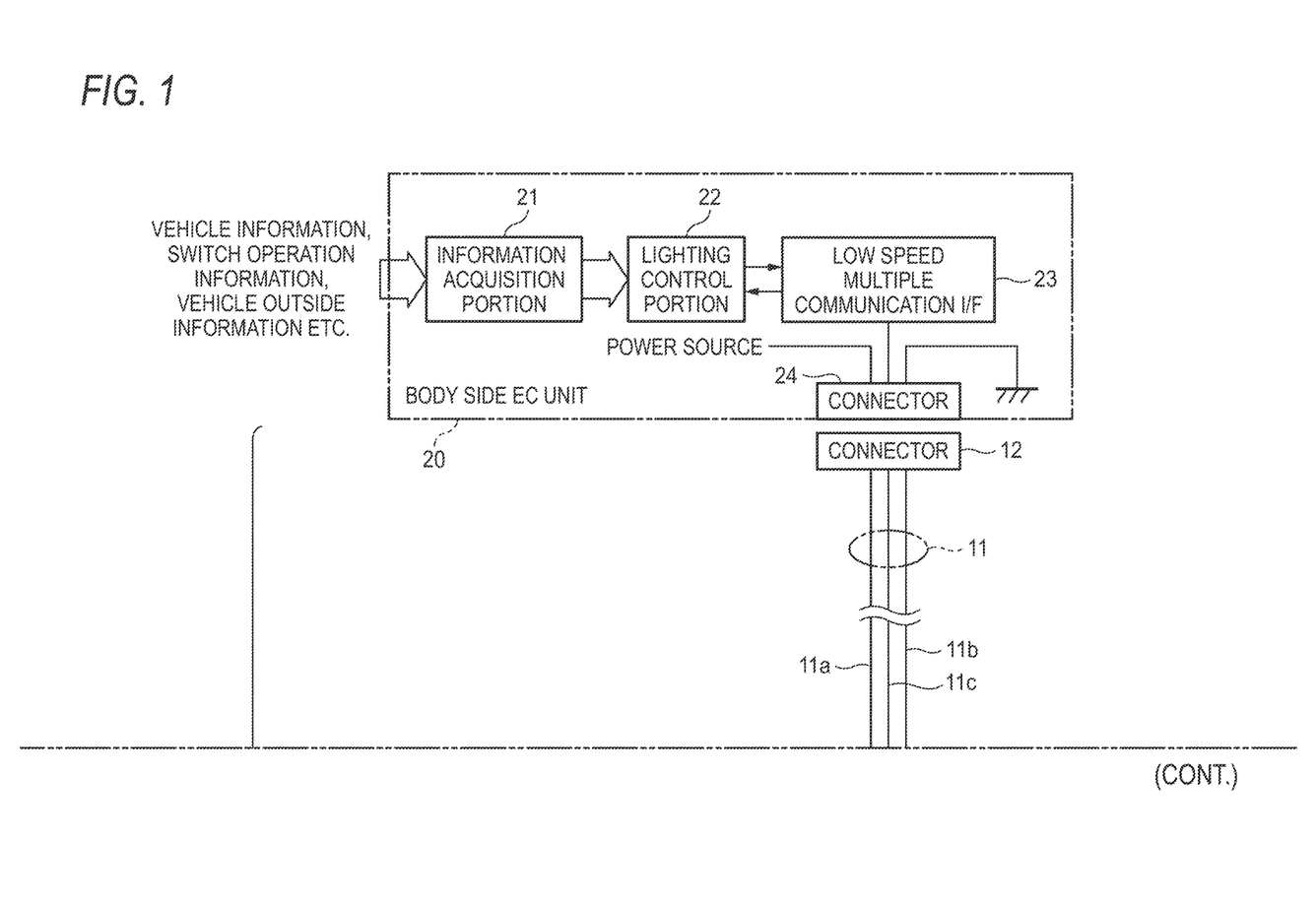
FIG. 1 is a block diagram showing a configuration example (1) of an onboard lighting system including a vehicle wire harness of a first exemplary embodiment.

FIG. 1 shows a configuration example (1) of an onboard lighting system including a wire harness 10 of an exemplary embodiment.

An onboard lighting system shown in FIG. 1 is a system for controlling an LED unit 31 that is electrical equipment for lighting and is made up of a body side electronic control unit 20, the LED unit 31 and a wire harness 10 that connects them together.

The LED unit 31 incorporates therein one or more LEDs as a light source and is placed at a predetermined location on a vehicle for use for any one of lighting outside the vehicle, lighting inside the vehicle, lighting for indicators and illumination. An actual configuration or specification of the LED unit 31 possibly changes as the grade of the vehicle on which the LED unit 31 is mounted differs or the specification of the vehicle changes.

The body side EC unit (ECU) 20 is a host control unit in charge of executing a user-oriented control on the vehicle and includes an electrical circuit that is made up mainly of a microcomputer. Thus, the body side EC unit 20 controls the LED unit 31 shown in FIG. 1 and other pieces of electrical equipment. As shown in FIG. 1, this body side EC unit 20 includes an information acquisition portion 21, a lighting control portion 22, a low speed multiple communication interface (I/F) 23 and a connector 24.

The information acquisition portion 21 acquires information representing various states of the vehicle that are outputted from predetermined sensors, information representing operated states of various switches and information representing states outside the vehicle that are outputted from predetermined sensors and gives the acquired pieces of information to the lighting control portion 22.

The lighting control portion 22 sends a control signal for controlling the LED unit 31, which is a control target, to the control target via the low speed multiple communication interface 23 based on states represented by various pieces of information that are inputted from the information acquisition portion 21.

Specific examples of control signals that the lighting control portion 22 sends to the LED unit 31 include a "command to start emitting red light or lighting a red LED," a "command to start emitting blue light or lighting a blue LED," a "command to start emitting red light and blue light or lighting the red LED and the blue LED" and a "command to turn off the LEDs." In this embodiment, the types of the control signals that the lighting control portion 22 sends are made common for all grades of a vehicle and all types of light sources.

Consequently, even though, for example, the type or configuration of the LED unit 31 that is connected to a downstream side of the wire harness 10 changes, the configuration or operation of the body side EC unit 20 does not have to be changed.

The low speed multiple communication interface 23 includes a function necessary to execute a two-way multiple data communication. However, an original standard is adopted that reduces sufficiently a data communication speed when compared with, for example, a controller area network (CAN) that constitutes a communication standard for a vehicle.

The following advantages can be obtained by reducing the communication speed.

(1) The low data communication speed makes it difficult for the low speed multiple communication interface 23 to be affected by noise in a transmission line.

(2) The limitation on the number of communication channels that can be transmitted in one transmission line is mitigated, thereby making it possible to increase the number of pieces of electric equipment that can be connected thereto.

The wire harness 10 shown in FIG. 1 includes an electric wire assembly 11, a connector 12 that is connected to one end side and a connector with controller 13 that is connected to the other end side thereof. The connector 12 on the one end side of the wire harness 10 is connected with a connector 24 of the body side EC unit 20, and the connector with controller 13 on the other end side thereof is connected with the LED unit 31 via a sub harness 32.

In the example shown in FIG. 1, the electric wire assembly 11 is made up of three electric wires of a power source wire 11a, an earth wire 11b and a communication wire 11c.

The connector with controller 13 connected to the other end side of the wire harness 10 means a special connector that incorporates therein an electronic circuit. Although the details of the connector with controller 13 will be described later, the electronic circuit inside the connector with controller 13 includes a data communication function and a control function that is subordinate to the body side EC unit 20. Thus, the electronic circuit has the functions necessary to control the LED unit 31.

In this embodiment, the configuration of the electronic circuit of the connector with controller 13 of the wire harness 10 possibly changes as the configuration or specification of the LED unit 31 connected thereto changes. For example, in the case where the LED unit 31 changes as the model line or grade of the vehicle changes, the wire harness 10 can be replaced with a wire harness 10 of a different type that corresponds to the change.

Figure 2:
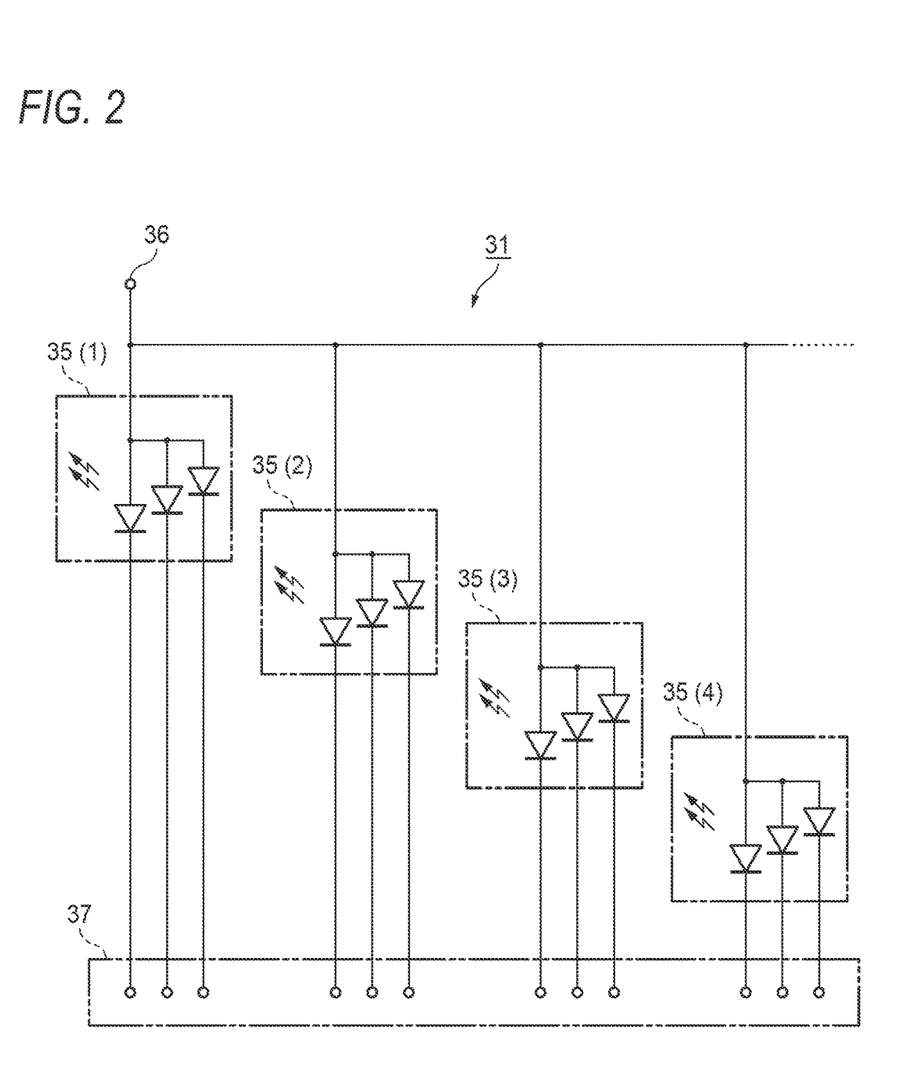
FIG. 2 is an electrical circuit diagram showing a configuration example of an LED unit that is included in the onboard lighting system shown in FIG. 1.

FIG. 2 shows a configuration example of the LED unit 31 included in the onboard lighting system shown in FIG. 1.

The LED unit 31 shown in FIG. 2 includes a multiplicity of LED devices 35(1), 35(2), 35(3), 35(4), . . . that can be controlled independently. The number of LED devices 35 possibly changes as the specification of the LED unit 31 changes.

In addition, the LED devices 35(1), 35(2), 35(3), 35(4), . . . shown in FIG. 2 each constitute a light source that incorporates LED elements of three colors of red (R), green (G) and blue (B) and can be controlled in relation to a color of light emitted therefrom.

Depending on the specification of the LED unit 31, there may be a case where a light source incorporating LED elements of any two colors of the three colors is used as the LED device 35 or there may be a case where a light source incorporating an LED element of any one of the three colors is used as the LED device 35.

In the LED unit 31 shown in FIG. 2, positive electrode sides of the LED devices 35 are connected to a terminal 36 and negative electrode sides of the LED devices 35 are connected to a terminal group 37. The terminal 36 and the terminal group 37 are connected to the connector with controller 13 of the wire harness 10 by way of the connector 32a of the sub harness 32 shown in FIG. 1.

As shown in FIG. 1, the electronic circuit provided in the interior of the connector with controller 13 includes a low speed multiple communication interface 14, a decoder 15, a driver operation portion 16, a fade pattern recording portion 17A, a color arrangement map recording portion 17B, an encoder 18 and an LED driver 19.

The low speed multiple communication interface 14 includes a function necessary to execute a two-way multiple data communication. Additionally, similar to the low speed multiple communication interface 23, the low speed multiple communication interface 14 adopts an original standard and executes a data communication at a lower speed than the speed at which a data communication is executed using the CAN standard.

The decoder 15 converts serial data that the low speed multiple communication interface 14 receives into parallel data that the driver operation portion 16 can process. The encoder 18 converts the parallel data that the driver operation portion 16 sends into serial data that the low speed multiple communication interface 14 can send.

The driver operation portion 16 is made up of a microcomputer and realizes various types of processing by executing a program incorporated in an interior thereof. Namely, the driver operation portion 16 shown in FIG. 1 includes functions of fade processing 16a, interlocking processing of Bi-Color LED, Tri-color LED 16b, cooperative processing of plural LEDs 16c, color matching correction processing 16d and diagnosis 16e.

In a state transition occurring when the LED unit 31 is switched on or off in accordance with an instruction from the body side EC unit 20, the fade processing 16a determines on the brightness of a light source or a color changing speed.

In the case where the LED devices of the LED unit 31 each include both a Bi-Color LED and a Tri-Color LED, the interlocking processing of Bi-Color LED, Tri-color LED 16b controls a timing at which these LEDs operate in an interlocked fashion or a change in color or brightness that is realized by the interlocked operation of the LEDs.

In the case where the LED unit 31 includes a plurality of LED devices, when the LED unit 31 is switched on or off, the cooperative processing of plural LEDs 16c controls an order in which the LEDs of the LED unit 31 are switched on or off or a speed at which the LED devices are switched on or off.

The color matching correction processing 16d executes an automatic correction to obtain, for example, a specific color developing characteristic of each of the LED devices of the LED unit 31 or a desired lighting color in consideration of a driving environment.

The diagnosis 16e diagnoses whether or not the electronic circuit in the connector with controller 13 or the LED unit 31 connected thereto operates properly. The results of the diagnosis are sent to the body side EC unit 20 via the encoder 18 and the low speed multiple communication interface 14.

The fade pattern recording portion 17A is a non-volatile memory and records therein a control procedure for use in switching on or off the LED unit 31. The fade pattern recording portion 17A records therein, for example, an order in which the cooperative processing of plural LEDs 16c switches on or off the plurality of LED devices of the LED unit 31 or data representing a color arrangement or luminance brightness of the LED unit 31 that the fade processing 16a changes as a control procedure.

The color arrangement map recording portion 17B is a non-volatile memory and records therein data on combinations of duty ratios necessary to obtain desired color arrangements when controlling energization duties of LEDs of a plurality of colors at the same time.

The driver operation portion 16 acquires necessary data from the fade pattern recording portion 17A and the color arrangement map recording portion 17B to thereby generate a signal necessary to make the LED unit 31 operate in a desired pattern that is determined in advance.

The LED driver 19 incorporates a multiplicity of switching elements (transistors or the like) for switching on or off the energization of the individual LED elements or the smallest control units of the LED unit 31 to which the LED driver 19 is connected. The driver operation portion 16 outputs a pulse signal for switching on or off the switching elements individually.

For example, an average value of an electric current that flows to the LED elements can be controlled by repeating switching on and off of the individual switching elements in the LED driver 19 by the use of a pulse signal that appears repeatedly in a constant cycle. For example, when the energization of three R (red), G (green) and B (blue) LED elements is controlled individually by the LED driver 19, lighting colors of various hues can be obtained by a combination of a duty ratio at which the R color is switched on and off, a duty ratio at which the G color is switched on and off and a duty ratio at which the B color is switched on and off. Additionally, the luminance brightness of light can be changed by controlling an overall duty ratio f the R, G and B colors.

For example, the internal configuration of the LED unit 31 changes as a model line, grade and specification of a vehicle differ and change. For example, in the example shown in FIG. 2, the LED devices 35 each include the LED elements of the three colors. However, there is the possibility that the LED device 35 is changed to be made up of LED elements of any two colors of the three colors or to be made up of an LED element of any one of the three colors. In addition, the number of LED devices 35 that are incorporated in the LED unit 31 is changed as required. There is also the possibility that the specification of each LED device 35 in terms of electric current characteristic or color developing characteristic is changed.

In the case where the number of terminals of the terminal group 37 changes as the number of LED devices 35 changes or the type of the LED device 35 changes, an appropriate control to match the configuration of the LED unit 31 can be enabled by changing the number of switching elements incorporated in the LED driver 19 of the connector with controller 13, and further by rewriting the contents of the data recorded in the fade pattern recording portion 17A and the color arrangement map recording portion 17B.

Namely, the operational specification of the body side EC unit 20 is fixed or is made common and hence does not have to be changed. Thus, a difference in model line, a difference in grade or a change in specification of a vehicle can be dealt with only by changing the configuration and operation of the electronic circuit that is incorporated in the connector with controller 13. Consequently, onboard lighting systems of various specifications can be configured, for example, only by replacing a wire harness 10 and an LED unit 31 of one type that are mounted on one vehicle with a wire harness 10 and an LED unit 31 of another type that are mounted on another vehicle.

Second Exemplary Embodiments

Figure 3:
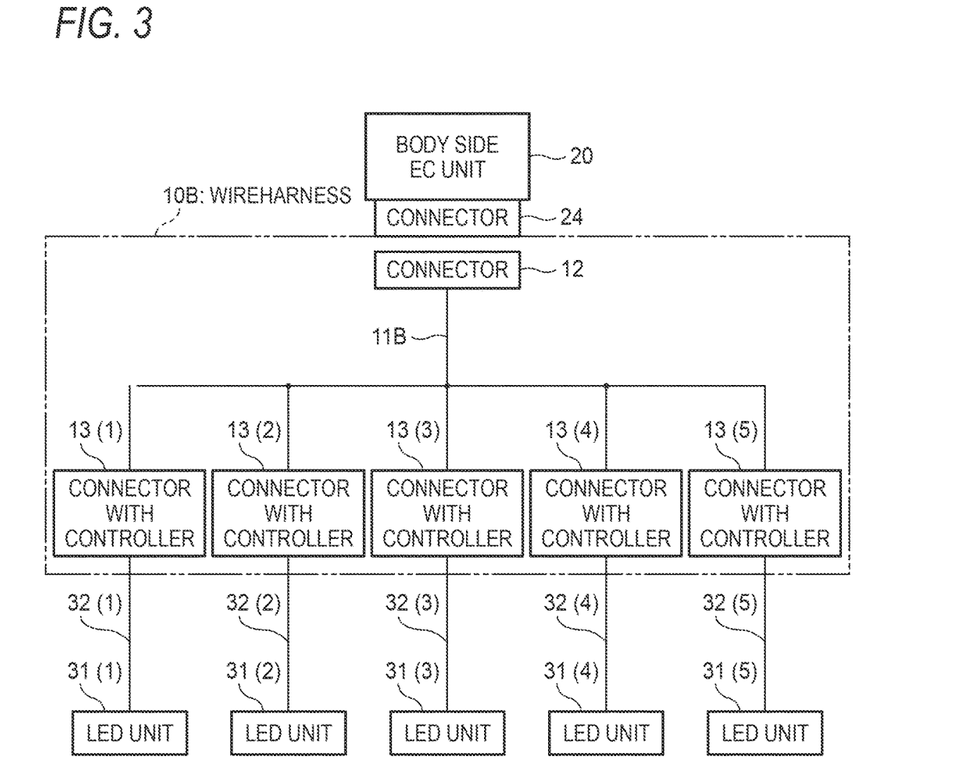
FIG. 3 is a block diagram showing a configuration example (2) of an onboard lighting system including a vehicle wire harness of a second exemplary embodiment.

FIG. 3 shows a configuration example (2) of an onboard lighting system including a vehicle wire harness of a second exemplary embodiment. An onboard lighting system shown in FIG. 3 is a modified example made to the onboard lighting system shown in FIG. 1. Thus, in FIG. 3, like reference numerals will be given to like elements to those shown in FIG. 1.

In the onboard lighting system shown in FIG. 3, five LED units 31(1), 31(2), 31(3), 31(4) and 31(5) are connected individually to a body side EC unit 20 by a wire harness 10B.

In the wire harness 10B, a connector 12 is connected to one end side of an electric wire assembly 11B and the other end side of the electric wire assembly 11B is divided into five lines, and connectors with controller 13(1), 13(2), 13(3), 13(4) and 13(5) are connected individually to end portions of the divided lines of the electric wire assembly 11B.

The connector 12 at one end side of the wire harness 10B is connected to a connector 24 of the body side EC unit 20. Additionally, the five connectors with controller 13(1), 13(2), 13(3), 13(4) and 13(5) are connected individually to the LED units 31(1), 31(2), 31(3), 31(4) and 31(5) via sub harnesses 32(1), 32(2), 32(3), 32(4) and 32(5), respectively.

Here, respective configurations of the LED units 31(1), 31(2), 31(3), 31(4) and 31(5) change as a model line, grade and specification of a vehicle differ and change. Respective configurations of electronic circuits incorporated in the five connectors with controller 13(1), 13(2), 13(3), 13(4) and 13(5) are similar to those shown in FIG. 1. However, internal configurations of LED drivers 19 and contents of data recorded in face pattern recording portions 17A and color arrangement map recording portions 17B are changed as required to match the configurations and specifications of the corresponding LED units 31(1) to 31(5).

The number of connectors with controller 13(1) to 13(5) that are connected to the electric wire assembly 11B can be increased as required. Namely, a multiple data communication is executed at low speeds between the body side EC unit 20 and the electronic circuits in the connectors with controller 13, and therefore, a limitation imposed on the number of channels of a signal carried by a single communication wire 11c is mitigated, thereby making it possible to connect the multiplicity of connectors with controller 13 to the common electric wire assembly 11B. This can also increase the number of LED units 31 that can be connected to a single onboard lighting system.

Third Exemplary Embodiment

Figure 4:
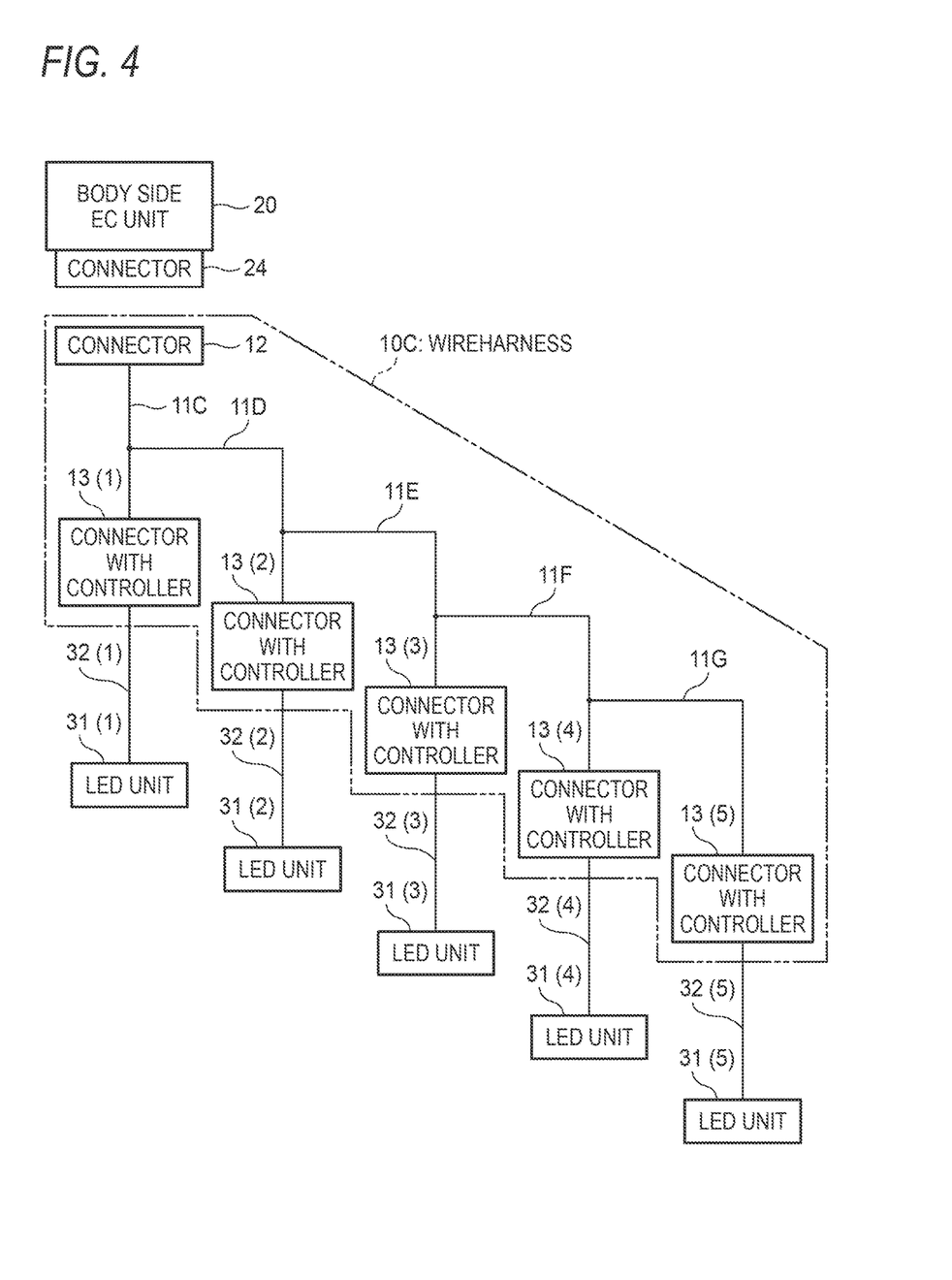
FIG. 4 is a block diagram showing a configuration example (3) of an onboard lighting system including a vehicle wire harness of a third exemplary embodiment.

FIG. 4 shows a configuration example (3) of an onboard lighting system including a vehicle wire harness of a third exemplary embodiment. An onboard lighting system shown in FIG. 4 is a modified example made to the onboard lighting system shown in FIG. 1. Thus, in FIG. 4, like reference numerals will be given to like elements to those shown in FIG. 1.

In the onboard lighting system shown in FIG. 4, five LED units 31(1), 31(2), 31(3), 31(4) and 31(5) are connected individually to a body side EC unit 20 by a wire harness 10C.

In the wire harness 10C, a connector 12 is connected to one end side of an electric wire assembly 11C, and a connector with controller 13(1) is connected to the other end of the electric wire assembly 11C. Then, one end side of an electric wire assembly 11D is connected to a branch point situated in a halfway position of the electric wire assembly 11C, and a connector with controller 13(2) is connected to the other end side of the electric wire assembly 11D. One end side of an electric wire assembly 11E is connected to a branch point situated in a halfway position of the electric wire assembly 11D, and a connector with controller 13(3) is connected to the other end side of the electric wire assembly 11E. Further, one end side of an electric wire assembly 11F is connected to a branch point situated in a halfway position of the electric wire assembly 11E, and a connector with controller 13(4) is connected to the other end side of the electric wire assembly 11E Additionally, one end side of an electric wire assembly 11G is connected to a branch point situated in a halfway position of the electric wire assembly 11F, and a connector with controller 13(5) is connected to the other end of the electric wire assembly 11G.

The connector 12 at one end side of the wire harness 10C is connected to a connector 24 of the body side EC unit 20. The five connectors with controller 13(1), 13(2), 13(3), 13(4) and 13(5) are connected individually to the LED units 31(1), 31(2), 31(3), 31(4) and 31(5) via sub harnesses 32(1), 32(2), 32(3), 32(4) and 32(5), respectively.

Here, respective configurations of the LED units 31(1), 31(2), 31(3), 31(4) and 31(5) change as a model line, grade and specification of a vehicle differ and change. Respective configurations of electronic circuits incorporated in the five connectors with controller 13(1), 13(2), 13(3), 13(4) and 13(5) are similar to those showing FIG. 1. However, internal configurations of LED drivers 19 and contents of data recorded in fade pattern recording portions 17A and color arrangement map recording portions 17B are changed as required to match the configurations and specifications of the corresponding LED units 31(1) to 31(5).

The number of connectors with controller 13(1) to 13(5) that are connected to the electric wire assemblies 11C to 11G can be increased as required. Namely, a multiple data communication is executed at low speeds between the body side EC unit 20 and the electronic circuits in the connectors with controller 13, and therefore, a limitation imposed on the number of channels of a signal carried by a single communication wire 11c is mitigated, thereby making it possible to connect the multiplicity of connectors with controller 13 to the common electric wire assembly 11C. This can also increase the number of LED units 31 that can be connected to a single onboard lighting system.

With the wire harness 11C that does not include, for example, the electric wire assembly 11G shown in FIG. 4 mounted in advance on the vehicle, an electric wire assembly 11G is retrofitted to a desired branch point situated in a desired position on the electric wire assembly 11F, thereby making it possible to increase the number of connectors with controller 13 and the number of LED units 31 to be connected thereto.

In accordance with embodiments, the vehicle wire harness (the wire harness 10, 10B, 10C) is connected electrically to the control unit (the body side EC unit 20) mounted on a vehicle at one end and is connected electrically to one or more light sources (the LED unit 31) at the other end thereof. The vehicle wire harness includes the driver operation portion (16) configured to receive the control signal designating the lighting form for the one or more light sources from the control unit and output the drive pattern for driving the one or more light sources. The driver operation portion is subordinate to the control unit.

According to this structure, the relation between the control signal that the control unit outputs and the one or more light sources that are connected to a downstream side of the vehicle wire harness can be matched by the driver operation portion in the interior of the vehicle wire harness. Consequently, even in the case where the configurations or specifications of the light sources connected change as the grade of a vehicle changes, the change can be dealt with at the driver operation portion. This enables the operations of the host control unit to be made common for various different types of pieces of electrical equipment (light sources) or various different grades of a vehicle. Namely, the necessity of of changing the configuration or the contents of processing of the control unit can be obviated, leading to a reduction in development cost of the whole system or parts cost.

In accordance with embodiments, the control unit makes up the electrical circuit that is mounted on the vehicle, and wherein the one end (the connector 12) can detachably be attached to the connector (24) of the electrical circuit.

According to this structure, the wire harness is detachably attached to the control unit by the connector at the one end thereof, and therefore, for example, a plurality of vehicle wire harnesses of different types can easily be replaced. Thus, a change in type of electrical equipment (a light source) to be connected or a change in grade of a vehicle can be dealt with only by replacing one vehicle wire harness with another vehicle wire harness.

In accordance with embodiments, the vehicle wire harness includes the storage portion (the fade pattern recording portion 17A, the color arrangement map recording portion 17B) configured to store the controlling procedure corresponding to the lighting form, wherein the driver operation portion (16) reads out the controlling procedure corresponding to the lighting form that the driver operation portion has received to generate the drive pattern in accordance with the controlling procedure.

According to this structure, the drive pattern that the driver operation portion generates can be changed only by changing the data of the controlling procedure held in the storage portion. Thus, a change in type of electrical equipment (a light source) to be connected to the downstream side of the vehicle wire harness or a change in grade of a vehicle can easily be dealt with.

In accordance with embodiments, the controlling procedure is a procedure of controlling at least one of a lighting order, color arrangement and luminance brightness of the one or more light sources.

According to this structure, at least one of the lighting order, color arrangement and luminance brightness of the one or more light sources can be changed only by changing the controlling procedure. Thus, a change in type of electrical equipment (a light source) to be connected to the downstream side of the vehicle wire harness or a change in grade of a vehicle can easily be dealt with.

When configuring an onboard system for controlling electrical equipment including a light source, the vehicle wire harness of the embodiments is useful in making operations of a control unit common for various types of pieces of electrical equipment. Namely, the relation between the control unit that the control unit outputs and the light source connected to the downstream side of the vehicle wire harness can matched by the driver operation portion in the interior of the vehicle wire harness. Thus, even though the configuration or specification of the light source to be connected changes as the grade of the vehicle changes, the change can be dealt with by the driver operation portion. This enables the operation of the host control unit to be made common for various different types of pieces of electrical equipment (light sources) or various different grades of a vehicle. Namely, the necessity of changing the configuration or the contents of processing of the control unit can be obviated, leading to a reduction in development cost of the whole system or parts cost.

DESCRIPTION OF REFERENCE NUMERALS 10, 10B, 10C Wire harness
11, 11B, 11C, 11D, 11E, 11F, 11G Electric wire assembly
11a Electric wire
11b Earth wire
11c Communication wire
12, 24, 32a Connector
13 Connector with controller
13a Terminal portion
14, 23 Low speed multiple communication interface
15 Decoder
16 Driver operation portion
16a Fade processing
16b Interlocking processing of Bi-Color LED Tri-color LED
16c Cooperative processing of plural LEDs
16d Color matching correction processing
16e Diagnosis
17A Fade pattern recording portion
17B Color arrangement map recording portion
18 Encoder
19 LED driver
20 Body side EC unit
21 Information acquisition portion
22 Lighting control portion
31 LED unit
32 Sub harness
35 LED device
36 Terminal
37 Terminal group

What is claimed is:

1. A vehicle wire harness including one end to be electrically connected to a control unit mounted on a vehicle and the other end to be electrically connected to one or more light sources, the vehicle wire harness comprising:
a decoder configured to receive a control signal designating a lighting form for the one or more light sources from the control unit, and to decode the control signal,
a driver operation portion configured to receive the control signal designating the lighting form for the one or more light sources from the decoder, after the control signal is decoded by the decoder, and to output a drive pattern for driving the one or more light sources; and
a storage portion that stores a controlling procedure corresponding to the lighting form, wherein the driver operation portion is subordinate to the control unit; and wherein the driver operation portion is configured to, after the control signal is decoded by the decoder, read out from the storage portion the controlling procedure corresponding to the lighting form that the driver operation portion received and to generate the drive pattern in accordance with the controlling procedure.

2. The vehicle wire harness according to claim 1, wherein the control unit includes an electrical circuit mounted on the vehicle, and wherein the one end is to be detachably attached to a connector of the electrical circuit.

3. The vehicle wire harness according to claim 1, wherein the controlling procedure is a procedure of controlling at least one of a lighting order, color arrangement and luminance brightness of the one or more light sources.

4. The vehicle wire harness according to claim 1, wherein a communication between the control unit and the one or more light sources is carried out based on a low speed multiple communication, wherein a data communication speed of the low speed multiple communication is lower than a data communication speed of a controller area network (CAN) that constitutes a communication standard of the vehicle.

5. The vehicle wire harness according to claim 1, wherein a configuration of the driver operation portion is changeable depending on a configuration or a specification of the light sources, and the control signal designating the lighting form is common irrespective of a kind of the light sources.

6. The vehicle wire harness according to claim 1, further comprising:

a connector including a controller, the connector connected to the one or more light sources, wherein the driver operation portion and the storage portion are accommodated in the connector that includes the controller.

7. A vehicle wire harness comprising:

a first connector provided at one end of the vehicle wire harness and configured to be electrically connected to a second connector of a control unit mounted on a vehicle; and a plurality of third connectors provided at other ends of the vehicle wire harness and configured to be electrically connected to respective connectors of a plurality of LED units, wherein each of the plurality of LED units includes a plurality of LED elements, wherein each of the plurality of third connectors includes:

a driver operation portion configured to receive a control signal designating a lighting form for a corresponding one of the plurality of LED units from the control unit and to output a drive pattern for driving the corresponding one of the plurality of LED units;

a storage portion that stores a controlling procedure corresponding to the lighting form, wherein the driver operation portion is configured to read out from the storage portion the controlling procedure corresponding to the lighting form that the driver operation portion received and to generate the drive pattern in accordance with the controlling procedure; and an LED driver including a plurality of switching elements configured to individually switch on or off the plurality of LED elements of an LED unit of the plurality of LED units connected to the third connector, wherein the driver operation portion outputs a signal for switching on or off the switching elements individually, and wherein the driver operation portions are subordinate to the control unit.

8. A vehicle wire harness including one end to be electrically connected to a control unit mounted on a vehicle and the other end to be electrically connected to one or more light sources, the vehicle wire harness comprising:

a driver operation portion configured to receive a control signal designating a lighting form for the one or more light sources from the control unit and to output a drive pattern for driving the one or more light sources; and a storage portion that stores a controlling procedure corresponding to the lighting form, wherein the driver operation portion is subordinate to the control unit; and wherein the driver operation portion is configured to read out from the storage portion the controlling procedure corresponding to the lighting form that the driver operation portion received and to generate the drive pattern in accordance with the controlling procedure, wherein the one or more light sources is a plurality of light sources, the controlling procedure comprises a first controlling procedure, corresponding to the lighting form, for a first light source of the plurality of light sources and a second controlling procedure, corresponding to the lighting form, for a second light source of the plurality of light sources, the first controlling procedure being different from the second controlling procedure based on a difference in at least one lighting specification between the first light source and the second light source, and the driver operation portion is configured to, in a case where the control signal received by the driver operation portion includes instructions designating that the lighting form of the first light source and the second light source is to be the same;

drive the first light source differently from the second light source, based on the controlling procedure, such that the lighting form of the first light source and the second light source are the same.

* * * * *